United States Patent [19]
Britt

[11] 3,750,689
[45] Aug. 7, 1973

[54] AIR INTAKE FOR A GAS TURBINE ENGINE
[75] Inventor: Jack Britt, Ambergate, England
[73] Assignee: Rolls-Royce (1971) Limited, London, England
[22] Filed: Sept. 11, 1972
[21] Appl. No.: 287,703

[30] Foreign Application Priority Data
Sept. 15, 1971 Great Britain.................. 42,900/71

[52] U.S. Cl.............. 137/15.1, 244/53 B, 60/39.29
[51] Int. Cl....................... F02b 27/02, F02k 11/00
[58] Field of Search.......................... 137/15.1, 15.2; 60/39.29; 244/53 B

[56] References Cited
UNITED STATES PATENTS
3,400,902  9/1968  King.................................. 244/53 B
3,623,494  11/1971  Poucher............................. 137/15.2

Primary Examiner—Alan Cohan
Attorney—John W. Malley, Lloyd J. Street et al.

[57] ABSTRACT

A gas turbine engine air intake cowl has a displaceable lip member which, when cross winds develop, moves forwardly of the cowl to form a slot therebetween through which the cross wind passes and is guided onto that intake wall on the windward side of the intake so avoiding pressure losses and bad air distribution in the intake.

4 Claims, 2 Drawing Figures

PATENTED AUG 7 1973 3,750,689
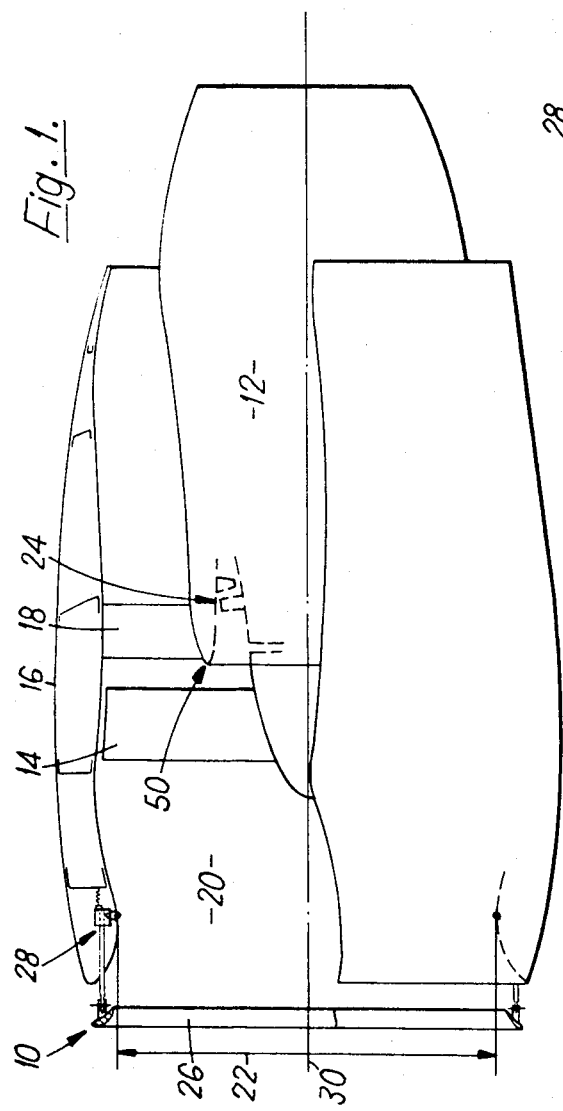
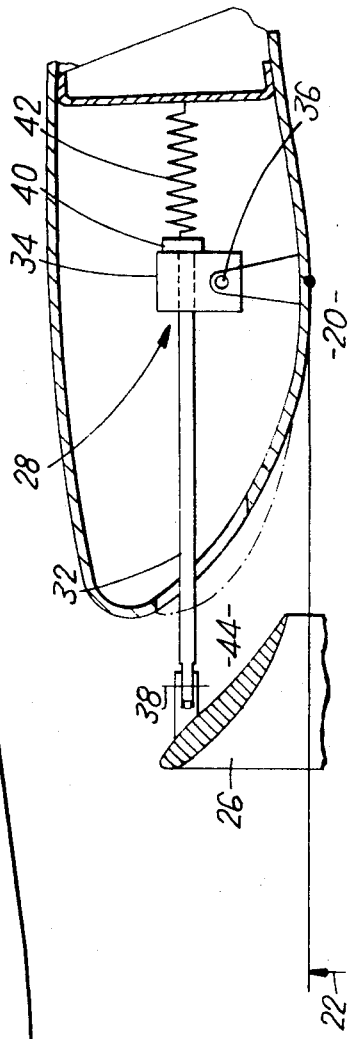

AIR INTAKE FOR A GAS TURBINE ENGINE

This invention concerns air intakes for gas turbine engines of the pure jet and ducted fan types and which are used mainly to power aircraft.

Air intakes having intake lips which are variable in profile so as to cater for cross-winds or the like and the effect that they have on intake efficiency during flight of an aircraft, are well known in the art. However, all of these intakes have at least one thing in common and that is that on varying their shape, either mechanically in response to signals, or by natural air pressure change phenomena, they also change the throat dimension of the intake.

This affecting of the throat dimension is not always desirable, particularly in two cases, namely during cruise of an aircraft powered by one or more engines having the features mentioned herein, or on ground running of the engine or engines of the same aircraft.

Thus, it is an object of this invention to provide a gas turbine engine having an air intake which is capable of dealing with cross-winds during flight of an aircraft powered by such an engine or engines, and capable of dealing with the ambient air which is sucked into the intake in a direction normal to the intake axis and which normally breaks away from the intake wall to leave areas of low pressure thereat and cause bad distribution of air at the fan or compressor face but which does not adversely affect the throat of the intake.

Accordingly the present invention comprises a gas turbine engine main air intake cowl having a fully annular intake lip member, displaceable relative to the remainder of the intake cowl so as to form a secondary, substantially annular air intake therebetween, the lip member having a minimum diameter greater than the main intake throat diameter and which in its operative, displaced position, guides ambient air flow which approaches the intake cowl at an angle to the cowl longitudinal axis, onto at least one side of the main intake wall via said substantially annular intake.

Preferably but not restrictively the annular lip member is displaced as a result of pressure drop across its thickness.

Preferably the annular lip member is in effect, gimbal mounted to the main air intake cowl so as to have limited pivoted movement about at least two axes which intersect orthogonally each other.

Preferably the air intake cowl is the air intake cowl for a ducted fan of a ducted fan gas turbine engine.

Alternatively, the air intake cowl is for the compressor or the first compressor of a multi compressor pure jet engine.

The invention will now be described with reference to the accompanying drawing in which:

FIG. 1 is a diagrammatic view of a ducted fan gas turbine engine,

FIG. 2 is an enlarged part view of a main air intake cowl of the engine of FIG. 1.

In FIG. 1 a ducted fan gas turbine engine is indicated generally by the numeral 10.

Engine 10 comprises a core gas generator 12 with a stage of fan blades 14 mounted at its upstream end in known manner. A fan cowl 16 is supported in coaxial spaced apart relationship with gas generator 12 by means of a plurality of struts 18 spaced circumferentially about the gas generator.

Fan cowl 16 extends in an upstream direction to a point beyond fan stage 14 and forms a main air intake 20 having a throat 22 through which, in operation, ambient air flows to both fan stage 14 and the compressor 24 of the core gas generator 12.

The extreme upstream end of cowl 16 has a completely annular lip member 26 which is separate therefrom and is displaceable in a direction axially of the cowl. Lip member 26 in cross-section is of aerofoil shape as can be seen more clearly in FIG. 2 and is attached to four points internally of the structure of cowl 16. Only one said point 28 is shown, but the four are equi-angularly spaced about the cowl axis 30, so as to provide pairs thereof which may work in unison as described later on in this specification.

The aerofoil cross-sectional profile of lip member 26 is arranged so that the leading edge 27 of the lip member has a greater diameter than the trailing edge 29 thereof. Moreover, the diameter of trailing edge 29 is greater than the diameter of throat 22 of main intake 20, and is so by an amount which ensures that no matter what operating attitude lip member adopts, its geometry has no effect upon the operation or disposition of throat 22.

The attachment structure comprises a rod 32 slidably mounted in a block 34 which in turn is mounted for pivoting about a fixed axis 36. One end of the rod protrudes through cowl 16 and is pivotally attached at 38 to lip member 26.

A stop 40 is fixed to that end of the rod internally of cowl 16 so as to prevent the rod being pulled out of block 34, also to provide specific maximum gap setting means between the cowl proper and lip member 26.

Biasing means, represented by a spring 42, are provided so as to bias the movement of lip member one way or another as required.

OPERATION

When an engine is being run on the ground for testing purposes, rotation of the fan and compressor sucks ambient air into intake 20 from both in front of the intake and from the sides thereof. The air from the front goes straight to the fan or compressor, but the air which comes from the sides cannot turn quickly enough to remain against the intake lip and wall, thus breaking away and creating areas of low pressure against the intake lip and wall. The biasing means 42 which may be set to overcome pressures lower than 1 atmosphere, then pushes on rods 32 and so displaces lip member 26 to a position upstream of cowl 16, thereby opening a secondary annular intake 44. That air which moves from the sides of the engine now passes through the new annular intake 44 and is caused by the constrictive effect of lip member 26, to adhere to the wall of intake 20, thus obviating the aforementioned low pressure areas.

In the event of a cross-wind, either during said ground running, or during flight of an aircraft upon which engine 10 would be mounted, the lip member would not be displaced bodily forwardly of the main cowl structure because air entering the intake at an angle to its axis would create a low pressure area on one side of lip member 26 and, by virtue of the dynamic head possessed by the moving air, create a higher pressure area on the diametrically opposite side of lip member 26. Thus lip member 26 will attempt to tilt about the high pressure side so as to create the new intake 44 mostly on the low pressure side of the lip member. The method of mounting the lip member, as described herein will permit the lip member to tilt.

If instead of operating the lip member by natural pressure change phenomena, a mechanical actuation system or the like were used, then in cross-wind conditions, the pressure differential across the diameter of lip member 26 could be overcome simply by fitting actuation means powerful enough to overcome the resistance to displacement offered by that side of lip member 26 which is subject to the high pressure. Thus, lip member 26 could be displaced bodily forward in a straight line, which would obviate the complicated gimbal type mounting but would possibly increase overall weight due to the mechanical actuation means.

It will be seen from the drawings and foregoing description that displacement of lip member 26 to obtain the secondary annular intake, does not affect the throat of the intake proper, in any way whatever. Thus the intake proper does not suffer the normal penalty of reduction in diameter with its consequent choking effect, which is suffered by those intakes whose contraction ratios are changed in order to obtain a more suitable lip shape so as to obviate the said low pressure areas.

The invention has been described in relation to its use on the air intake of a ducted fan, but as shown in FIG. 1 at 50, the invention can be employed on the air intake of the compressor of a pure jet engine.

I claim:

1. A gas turbine engine main air intake cowl and an annular lip member having a minimum diameter greater than the main air intake throat diameter, said lip member being positioned at the upstream end of said cowl and displaceable therefrom so as to form a secondary substantially annular air intake therebetween, such that the lip member in its displaced position, guides ambient air flow which approaches the intake cowl at an angle to the cowl axis, onto at least one side of the main air intake wall, via said secondary substantially annular air intake.

2. A gas turbine engine main air intake cowl as claimed in claim 1 including lip displacing means adapted to displace said lip if and when said lip experiences a pressure of less than one atmosphere thereon.

3. A gas turbine engine main air intake cowl and an annular lip member as claimed in claim 1 said lip member having displacing means and being mounted to said cowl by gimbal connections so that on being displaced by said displacing means, said lip tilts relative to said cowl.

4. A gas turbine engine main air intake cowl and an annular lip member having a minimum diameter greater than the main air intake throat diameter, said lip member being positioned at the upstream end of said cowl and displaceable therefrom by displacing means so as to form a secondary substantially annular air intake therebetween, said displacing means being adapted to displace said lip if and when said lip experiences a pressure of less than one atmosphere thereon, said lip being gimballed to said cowl such that if said presssure of less than one atmosphere is applied to one side only thereof, said lip will tilt relative to said cowl.

* * * * *